United States Patent
Moulsley et al.

(10) Patent No.: US 8,995,497 B2
(45) Date of Patent: Mar. 31, 2015

(54) METHOD FOR OPERATING A SECONDARY STATION

(75) Inventors: Timothy James Moulsley, Caterham (GB); Milos Tesanovic, Harrow (GB)

(73) Assignee: Koninklijke Philips N.V., Eindhoven (NL)

(*) Notice: Subject to any disclaimer, the term of this patent is extended or adjusted under 35 U.S.C. 154(b) by 120 days.

(21) Appl. No.: 13/634,888

(22) PCT Filed: Mar. 24, 2011

(86) PCT No.: PCT/IB2011/051250
§ 371 (c)(1),
(2), (4) Date: Sep. 14, 2012

(87) PCT Pub. No.: WO2011/121499
PCT Pub. Date: Oct. 6, 2011

(65) Prior Publication Data
US 2013/0010888 A1    Jan. 10, 2013

(30) Foreign Application Priority Data
Apr. 2, 2010   (EP) .................................... 10305348

(51) Int. Cl.
*H04B 1/00* (2006.01)
*H04L 1/00* (2006.01)
*H04B 7/06* (2006.01)

(52) U.S. Cl.
CPC ............... *H04L 1/0025* (2013.01); *H04B 7/063* (2013.01); *H04L 1/0029* (2013.01)
USPC ........................... 375/141; 375/267; 375/299

(58) Field of Classification Search
USPC .......... 375/141, 146, 147, 260, 267, 299, 340
See application file for complete search history.

(56) References Cited

U.S. PATENT DOCUMENTS

| | | | |
|---|---|---|---|
| 2009/0323849 A1* | 12/2009 | Bala et al. ...................... | 375/267 |
| 2011/0032839 A1* | 2/2011 | Chen et al. ..................... | 370/252 |
| 2011/0176629 A1* | 7/2011 | Bayesteh et al. .............. | 375/267 |
| 2014/0044209 A1* | 2/2014 | Moulsley et al. ............. | 375/267 |

OTHER PUBLICATIONS

"UE Feeddback Extension for SU/MU-MIMO", 3GPP TSG RAN WG1 #60, R1-101019, Sony Corporation, Feb. 22-26, 2010, pp. 1-6.
"PMI-Based Multi-Granular Feedback for SU/MU-MIMO Operation", 3GPP TSGS-RAN WG1 #60, R1-100852, Ericsson, STS-Ericsson, Feb. 22-26, 2012, pp. 1-5.
"PMI Feedback Fro MU and SU-MIMO", 3GPP TSG RAN WG1 Meeting #60BIS, R1-102250, Philips, Apr. 12-16, 2010, pp. 1-6.
Lee et al, "MIMO Technologies in 3GPP LTE and LTE-Addvanced", Hindawi Publishing Corporation, EURASIP Journal on Wireless Communications and Teworking, vol. 2009, Article Id 302092, Jan. 1, 2009, pp. 1-10.
"Feedback Framework Consideration for Single Cell MIMO", 3GPP TSG RAN WG1 Meeting #59, R1-094713, Huawei, Nov. 9-13, 2009, pp. 1-3.
"Downlink MU-MIMO and Related Feedback Support", 3GPP TSG RAN WG1 59, R1-095019, Texas Instruments, Nov. 9-13, 2009, pp. 1-7.
Ghosh et al, "Multi-Antenna Systems for LTE ENODEB" Vehicular Technology Conference, IEEE 7thth Sep. 20, 2009, pp. 1-4.

* cited by examiner

*Primary Examiner* — Dac Ha

(57) ABSTRACT

The invention relates to a method for operating a secondary station, the secondary station communicating with at least one primary station by means<MIMO transmissions, the method comprising the secondary station signaling a single precoding indicator representative of a set of recommended precoding coefficients to the primary station, wherein the same precoding indicator applies for a plurality of available transmission modes.

19 Claims, 1 Drawing Sheet

METHOD FOR OPERATING A SECONDARY STATION

FIELD OF THE INVENTION

The present invention relates to methods for operating radio stations in mobile communication networks, where a primary station communicates with at least one secondary station.

This invention is, for example, relevant for IEEE 802.11 networks or as well for UMTS Long Term Evolution (LTE and LTE-Advanced) networks, where the communications between the primary station and the secondary station can use different modes, for example MIMO transmissions for Multi/Single-User, different ranks of MIMO transmissions, or even SISO/MIMO mode.

BACKGROUND OF THE INVENTION

In a cellular telecommunication system, a plurality of user terminals within a cell communicates with a primary station serving the cell. With the subsequent generations of cellular systems, the achievable data rate has been keeping increasing. In advanced systems such as UMTS and LTE, multi-antenna transmission/reception techniques variously described as, MIMO, precoding or beamforming are supported for transmissions from a single primary station to a mobile terminal. Thanks to the spatial selectivity of the beamforming mode, such transmission modes have enabled an important increase of the achievable data rate and of the range of communication, while maintaining the average interference level.

In order to achieve the beamforming, a typical transmitting station having an antenna array applies a set of complex coefficients (forming a precoding matrix or precoding vector) to a signal transmitted from its respective antennas, so that the transmission stream is spatially directed towards a receiving station. In a wireless communication system such as LTE, both the base station and terminal are typically equipped with multiple antennas. This allows different MIMO operation modes along with conventional transmission modes, like SISO transmission modes. To support the base station in determining the channel conditions in view of selecting a suitable transmission mode, the mobile terminals typically measure the downlink channels for each pair of antennas and derive a channel state report to send to the base station.

The base station can then use this information for scheduling decisions such as:
 Which terminals to transmit to;
 Which frequency/time/code resources are used;
 MIMO transmission mode parameters (e.g. number of spatial streams and SU-MIMO or MU-MIMO).

In implementations of such systems, precoding codebooks are defined. These precoding codebooks may be viewed as a way of describing precoding matrix (or precoding vector) of the channel precoding coefficients or precoding weights in a compact way, thereby reducing the amount of required signalling for indicating the precoding. These codebooks also enable the user terminal (defined in LTE as a User Equipment or UE) to report to the network a preferred precoder for downlink transmission, in the form of an index to codebook entry.

In this case, the preferred precoder is a set of complex coefficients to be applied to transmit antennas of the base station (defined in LTE as an eNodeB). Similarly, precoding codebooks may also be used by the base station to signal the precoding used for a transmission to the user terminal. This enables the user terminal to derive an appropriate phase/amplitude reference from common pilot symbols for demodulation of each downlink transmission.

An effective method for capturing the channel state information is to select the entry from a codebook of precoders which, if applied at the transmitter, would lead to the highest data rate. This information could be signalled as a PMI (Precoding Matrix Indicator). The number of spatial streams assumed, or rank indicator (RI), would typically be part of such a report.

As an example of codebook design, the LTE Release 8 codebook for 4 Tx antennas has a nested structure. This means that for a given codebook index the precoding vectors for given transmission rank are subset of the vectors for the next higher rank. This feature could be helpful in using the same codebook for both SU-MIMO (with multiple layers transmitted to the same terminal) and MU-MIMO (with a limited number of layers transmitted to more than one terminal).

For LTE-A it is intended that dynamic switching between SU-MIMO and MU-MIMO transmission modes will be supported. In this case it is desirable that the UE feedback is appropriate for both modes. This could be achieved by sending a PMI/RI and CQI for both modes. The main differences between PMI/CQI calculations for the two modes could be:—
 the maximum transmission rank assumed (e.g. limited only by the number of antennas for SU-MIMO and up to rank=2 for MU-MIMO)
 the power available (e.g. full power for SU-MIMO and power divided between terminals for MU-MIMO)
 possibly different assumptions about interference However, it requires a higher amount of resources. One aim of the invention is to reduce the number of bits required to signal the PMI.

SUMMARY OF THE INVENTION

It is an object of the invention to propose a method which alleviates the above mentioned problems.

It is another object of the invention to propose a method which enables the primary station to take a decision with respect to the selection of suitable transmission mode without requiring a large amount of signalled resource.

It is another object of the invention to propose a method which reduces the amount of calculation required in the secondary station to provide the recommended set of precoding coefficients.

In accordance with a first aspect of the invention, a method is proposed for operating a secondary station, the secondary station communicating with at least one primary station by means of MIMO transmissions, the method comprising the secondary station signaling a single precoding indicator representative of a set of recommended precoding coefficients to the primary station, wherein the same single precoding indicator applies for a plurality of available transmission modes.

In accordance with a second aspect of the invention, a secondary station is proposed, said secondary station comprising means for communicating with at least one primary station by means of MIMO transmissions, and means for signaling a single precoding indicator representative of a set of recommended precoding coefficients to the primary station, wherein the same single precoding indicator applies for a plurality of available transmission modes.

In accordance with a third aspect of the invention, a primary station is proposed, said primary station comprising means for communicating with at least one secondary station by means of MIMO transmissions, the method comprising the primary station receiving from the secondary station a single precoding indicator representative of a set of recommended precoding coefficients, wherein the same single precoding indicator applies for a plurality of available transmission modes, and wherein the primary comprises control means for selecting a transmission mode out of the plurality of available transmission mode based at least partly on the recommended precoding coefficients.

Accordingly, the secondary station signals only one precoding indicator that applies for a plurality of transmission modes. Indeed, instead of providing a precoding indicator for each transmission mode, each representative of a recommended set of coefficients for each corresponding transmission mode, it only requires one single precoding indicator, which may be representative of a different set of recommended set of precoding coefficients for each of a plurality of transmission modes. Thus, the amount of resource needed to signal the recommended precoding coefficients is reduced. One embodiment of the invention is based on the recognition that a jointly optimised codebook index for two different transmission modes (e.g. SU-MIMO and MU-MIMO, or others) will not lead to significantly lower data rates in practice. Furthermore, in the particular example of SU-MIMO/MU-MIMO, it is likely that the choice of a sub-optimal codebook index for SU-MIMO has less impact on the transmission rate than for MU-MIMO, in which case the index selection can be biased towards achieving a high transmission rate for MU-MIMO.

Moreover, the signaling of one single precoding indicator may require less computations and operations from the secondary station, leading thus to a reduced computation power requirement and a reduced energy cost for the secondary station.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
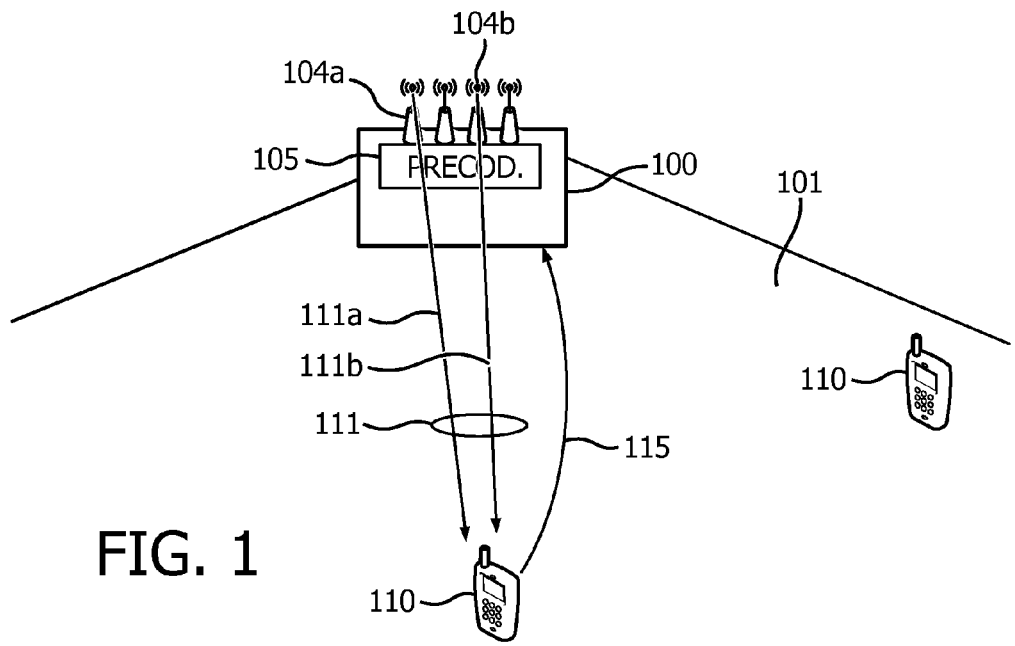
FIG. 1 is a block diagram of a system in which a first embodiment of the invention is implemented.

This invention relates to a mobile communication system like a 802.11, e.g. 802.11n, or a UMTS, e.g. UMTS LTE or LTE-Advanced system as illustrated on FIG. 1. A primary station, e.g. in an LTE embodiment, an eNodeB, 100 communicates with a plurality of secondary stations, e.g. in an LTE embodiment, User Equipments (UEs) 110.

The telecommunication system of FIG. 1 comprises a primary station 100 operating in cell 101 where a plurality of secondary stations 110 is located. For the sake of clarity, only two secondary stations 110 are represented on FIG. 1. The primary station 100 comprises a plurality of transmit antennas 104 controlled by a precoder 105 which can adjust the gain and phase of the signals applied to the transmit antennas to transmit in a beamforming mode on one or more spatial channels. A single data beam 111 resulting from the data signals 111a and 111b is represented on FIG. 1 from the primary station 100 to a secondary station 110. For the sake of clarity, only one data beam is represented on FIG. 1, corresponding to Single User-MIMO transmission mode (SU-MIMO). In a Multi User-MIMO (MU-MIMO) operation mode, further beams would be directed to other secondary stations 110. This data beam 111 forming a spatial channel on which data may be transmitted on data channel like the PDSCH (Physical Downlink Shared CHannel) for instance. The secondary station may be informed by physical layer signalling (e.g. PDCCH or Physical Downlink Control CHannel) of the spatial channel (e.g. an antenna port or virtual antenna) used for the data transmission carried on the PDSCH.

To feed back to the primary station 100 a recommended set of precoding coefficients, the secondary station 110 uses an uplink control channel 115.

In accordance with a first embodiment of the invention, it is proposed that the precoding coefficients are signaled with one report common to a plurality of transmission modes, for example, not restricted to only SU-MIMO and MU-MIMO. For example, the same can be done for MIMO transmission modes differing by the rank of transmission. The rank of transmission defines the number of data streams used, and the number of antennas dedicated to the transmission. It is to noted that in the embodiments below, the codebooks for SU-MIMO and MU-MIMO could be independent, or a combined codebook, for example using the nested properties found in the LTE Rel 8 codebook for 4 transmit antennas.

In the case of SU-MIMO/MU-MIMO as in FIG. 1, this embodiment of the invention is based on the assumption that a jointly optimised codebook index for SU-MIMO and MU-MIMO will not lead to significantly lower data rates in practice. The jointly optimized codebook may lead to a slightly worse data rate than a dedicated optimized codebook index. However, from tests, it appears that this degradation is quite small.

It is to be noted that a single precoding indicator may indicate a plurality of sets of precoding coefficients. Indeed, the retrieval of the coefficients in the primary station depends on the received codebook index, and on other parameters, like whether the mode is MU-MIMO or SU-MIMO, or the transmission rank. In fact, a particular set of coefficients indicated by a given codebook index will typically depend on the transmission mode considered (e.g. the transmission rank) and the codebook design. Typically for transmission ranks greater than one, a different part of the set of coefficients would be associated with each spatial stream (or layer).

Further, it appears that in some scenarios the choice of a sub-optimal codebook index for SU-MIMO has less impact on the transmission rate than for MU-MIMO, in which case the index selection can be biased towards achieving a high transmission rate for MU-MIMO. This can be done in the selection phase in the secondary station, by a computation of a weighted joint rate, as will be seen in variants of this embodiment hereafter.

Indeed, in accordance with this first embodiment, the secondary station selects the set of recommended precoding coefficients, denoted by index i, for example, from measurements carried out on received signals. In variants, the secondary station can also select a rank from the set of possible ranks $r_k = \{r_{k,1}; \ldots; r_{k,n}\}$ for a transmission mode k. This selection of i and/or $r_k = \{r_{k,1}; \ldots; r_{k,n}\}$ is done such that the joint rate:

$$R(i) = \sum_{k=1}^{m} \alpha_k R_{MIMOk}(i, r_k)$$

is maximized. In this equation, the weights may be such that $0 \leq \alpha_k < 1$, and $R_{MIMOk}$ is an estimated data rate for the MIMO transmission mode k. In a particular case, $$\sum_{k=1}^{m} \alpha_k = 1.$$

More specifically, in the case where the PMI is common to two transmission modes, e.g. SU-MIMO/MU-MIMO, the secondary station computes a joint rate for each codebook index as follows $$R_{joint}(i, r_{SU}, r_{MU}) = \alpha R_{SU}(i, r_{su}) + \beta R_{MU}(i, r_{MU})$$

Where:
i is a joint codebook index, used to indicate a codebook entry in both SU and MU-MIMO codebooks;
$r_{SU}$ and $r_{MU}$ are the transmission ranks for SU-MIMO and MU-MIMO respectively;
$R_{SU}$ and $R_{MU}$ are the achievable transmission rates for SU-MIMO and MU-MIMO respectively;
$\alpha$ and $\beta$ are weighting factors. As a special case, discussed further below $\beta = 1 - \alpha$.

Typically the codebook search would give the set of $i, r_{SU}, r_{MU}$ which maximises the total (joint) rate.

The choice of $\alpha$ (and/or $\beta$) can be used to bias the choice of codebook index towards SU or MU MIMO. It could also be considered as being related to the average probability that SU or MU MIMO transmission would be chosen by the base station. In this case the value of $\alpha$ a could be designed to maximise the average rate achieved over some time interval. This weight may be predetermined. However, in a variant, this weight is adjusted by the primary station and signaled to the secondary station, in dependence of the situation and which transmission modes should be favored. Thus, in this variation of the first embodiment, the base station signals a weighting factor to adjust the bias of codebook index (PMI) selection towards either SU or MU-MIMO. In a further variation the weighting factor may be chosen by the secondary station and possibly signaled to the primary station.

Figure 2A:
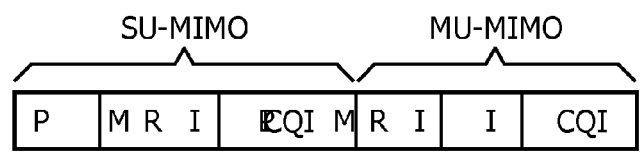
FIGS. 2A, 2B represent the signalling message used to report the precoding coefficients in accordance with a conventional method and with the first embodiment respectively.
Figure 2B:
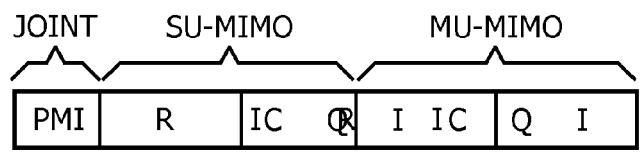

FIGS. 2A and 2B permits to compare the resource saving obtained thanks to this embodiments. On FIGS. 2A and 2B, typical numbers of bits for the secondary station feedback for a codebook for 8 antennas, and assuming 8 receive antennas would be as follows:—

FIG. 2A, for a conventional system:
SU-MIMO field including:
    PMI (6 bits)
    RI (Rank Indicator)—rank 1 to 8 (3 bits)
    CQI (Channel Quality Indicator) for up to two codewords (6 bits)
MU-MIMO
    PMI (6 bits)
    RI—rank 1 or 2 (1 bit)
    CQI for up to two codewords (6 bits)
For a Total requirement of 28 bits.
FIG. 2B, for a system in accordance with the invention:
Joint signalling
    PMI (6 bits)
SU-MIMO
    RI—rank 1 to 8 (3 bits)
    CQI for up to two codewords (6 bits)
MU-MIMO
    RI—rank 1 or 2 (1 bit)
    CQI for up to two codewords (6 bits)
For a total requirement of 22 bits.

Then, the base station can schedule transmissions to one or more UEs based on this information, selecting for example, the transmission scheme and packet size. Available transmission schemes include SU and MU-MIMO where one or more spatial layers are transmitted. In this example, with up to two codewords transmitted, the estimated total achievable transmission rate would be the sum of the rates achievable for each codeword.

In a further variation, the transmission rank for SU-MIMO is jointly encoded with the transmission rank for MU-MIMO, since under typical assumptions the rank for MU-MIMO should always be equal or lower.

Figure 3:
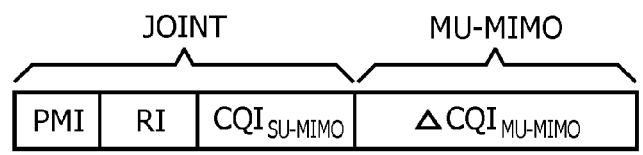
FIG. 3 represents the frame used to report the precoding coefficients in accordance with a second embodiment of the invention.

In a further variation illustrated on FIG. 3, the transmission ranks considered for SU-MIMO do not include transmission ranks considered for MU-MIMO. This would be appropriate if the assumptions for feedback computation for SU-MIMO and MU-MIMO only differ in the assumptions on transmission rank. Thus, it permits to reduce again the amount of data to be sent. In a further variation also one or more of the CQI values are differentially encoded, since the values are likely to be similar.

Joint signalling
    PMI (6 bits)
    RI—rank
    CQI for SU-MIMO (6 bits)
MU-MIMO
    Differential CQI (3 bits). The CQI for a MU-MIMO codeword is obtained by adding the CQI for one of the SU-MIMO codewords and the differential CQI.

In similar embodiments, each set of parameters includes for each respective transmission mode at least one of: the preferred rank of transmission, an achievable data rate, an estimate of an achievable data rate, additional information for at least one of the available transmission modes indicating a different set of precoding coefficients than signaled by the single precoding indicator.

In a further example, the transmission rank for MU-MIMO is restricted to rank 1.

In a further variation feedback is transmitted for more than one part of the available transmission spectrum.

It is to be noted that in this embodiment, only two different transmission modes where illustrated for the sake of simplicity and conciseness. However, this embodiment is not limited to two transmission modes and can easily be extended to consider more than two transmission modes.

In another embodiment, the transmission modes being considered jointly for the codebook index selection are MIMO transmission modes with different transmission rank ranges. Indeed, in an example of this embodiment, the first transmission rank range may be r=1, i.e. a rank 1 MIMO transmission mode, and a second transmission range may be r={2;4;8}, i.e. a MIMO transmission mode of rank of at least 2 (a plurality of streams directed to the secondary station). In an example, the different transmission modes considered for joint optimisation of the codebook index are MU-MIMO (rank 1) and MU-MIMO (rank 2). In another example, more than two transmission modes are considered for joint optimisation of the codebook index, for example SU-MIMO, MU-MIMO (rank 1), MU-MIMO (rank 2).

In accordance with a second embodiment of the invention, the system differs from the system of the first embodiment in the selection of the joint codebook index. In the first embodiment, it was proposed computing a joint rate for each codebook index by maximizing $$R_{joint}(i, r_{SU}, r_{MU}) = \alpha R_{SU}(i, r_{SU}) + \beta R_{MU}(i, r_{MU})\qquad 5$$

Where
i is a joint codebook index, used to indicate a codebook entry in both SU and MU-MIMO codebooks
$r_{SU}$ and $r_{MU}$ are the transmission ranks for SU-MIMO and MU-MIMO respectively
$R_{SU}$ and $R_{MU}$ are the achievable transmission rates for SU-MIMO and MU-MIMO respectively
$\alpha$ and $\beta$ are weighting factors. As a special case, $\beta = 1 - \alpha$.
Typically the codebook search would give the set of i, $r_{SU}$, $r_{MU}$ which maximises the total (joint) rate.

The second embodiment is not restricted to considering SU-MIMO and MU-MIMO. It could be applied in any case where the eNB may want to use a different transmission rank to the one indicated by the UE. For example, an alternative criterion for codebook search could be to choose the optimum value of codebook index $i = f_{opt}$ to maximise:—

$$R_{joint}(i) = \alpha R_{SU}(i, r_{opt}) + (1 - \alpha) R_{SU}(i, 1) \qquad (2)$$

Here the joint rate is computed as a weighted average of rates for rank 1 and the rank which gives the highest rate (i.e. $r_{opt}$). Thus, the secondary station selects the set of recommended precoding coefficients i, such that the joint rate is maximized. This joint rate is based on a weighted average of the rates for rank 1 and the rank which gives the highest rate.

In a more general case, the reported codebook index could be an optimization considering two or more transmission rates derived according to different assumptions (e.g. different rank, different transmission mode, different interference assumptions)

Part of the channel state report from the UE in LTE is a CQI value which is effectively the transmission rate that the channel can support. In this case two CQI values, corresponding to $R_{SU}(i_{opt}, r_{opt})$ and $R_{SU}(i, 1)$ respectively, could be reported. However, it would be desirable to minimise the overhead for CQI reporting (e.g. to report only one CQI value). Note that differential coding between two values is known (e.g. reporting one CQI value and the difference between that and a second value).

In the above embodiment, the UE may report a CQI value corresponding to the maximised joint rate from in the codebook search (e.g. as derived from the criterion in equation 2)

However, this may not be the best CQI value to report in practice. We note that in general:—

$$R_{SU}(i_{opt}, r_{opt}) \geq R_{SU}(i, 1)$$

Further, based on the Shannon-Hartley equation for channel capacity $R = B \log_2(1 + S/N)$ we note that $R_{SU}(i_{opt}, r_{opt}) \leq r_{opt} R_{SU}(i_{opt}, 1)$ which places upper and lower bounds on the maximum rate which would be reported i.e. $r_{opt} R_{SU}(i_{opt}, 1) \geq R_{SU}(i_{opt}, r_{opt}) \geq R_{SU}(i_{opt}, 1)$. This suggests that reporting $r_{opt} R_{SU}(i_{opt}, 1)$ would allow the eNB to know the rate for rank 1, and to estimate the rate for the optimum rank (e.g. as $(r_{opt} + 1) R_{SU}(i_{opt}, 1)/2$). Accordingly, it is advantageous that the secondary station reports to the primary station a rate estimation value based on the product of the selected transmission rank and the data rate obtained for the set of recommended precoding coefficients with a predetermined rank.

A further possibility would be to report a rate which minimises the combined error in the estimate of rates for rank 1 and optimum rank at the eNB. This could be achieved by reporting a combined weighted rate such as $$R_{av} = \delta r_{opt} R_{SU}(i_{opt}, 1) + (1 - \delta) R_{SU}(i_{opt}, r_{opt})$$

Or, more generally $$R_{av} = \delta r_{opt} R_{SU}(i_{opt}, 1) + \epsilon R_{SU}(i_{opt}, r_{opt})$$

where $\delta$ and $\epsilon$ are weights, $r_{opt}$ is the optimal rank, $i_{opt}$ is the set of optimal precoding coefficients, and $R_{SU}(i, r)$ is the data rate for the transmission mode with rank r, and the set of precoding coefficients i.

Based on knowledge of the reported rank and the statistics of rates for different ranks, the eNB could then estimate the rates observed by the UE for the optimum rank and rank 1, which would be facilitated by eNB and UE using the same values for $\delta$ and $\epsilon$. These values could be fixed in the specification, configured by higher layer signalling, or computed from some other parameters. They could also depend on channel conditions (e.g. SNR, optimum transmission rank).

In a more general case, the reported CQI could be a combination of two or more CQI/rate values derived according to different assumptions (e.g. different rank, different transmission mode, different interference assumptions).

In the exemplary embodiments, the recommended precoding coefficients are determined in the user equipment, in view of downlink transmission. However, in variants of the invention, the base station or node B may determine the recommended precoding coefficients in accordance with the invention, and signal these in a similar manner as in the above detailed embodiments. Moreover, in LTE for example, the same codebook may be used on one hand to signal to a user terminal the precoding vector or matrix which is actually applied in the downlink by a base station and on the other hand and as explained in the above embodiments to feedback the preferred precoding matrix by the user terminal to enable a phase/amplitude reference to be derived.

The invention has particular, but not exclusive, application to wireless communication systems that employ multiple modes of transmission between a primary and secondary station, most notably MIMO and MU-MIMO modes. Examples include cellular systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a mobile station, the mobile station communicating with at least one base station by means of multiple input/multiple output (MIMO) transmissions from the base station to the mobile station, the method comprising:
   selecting at the mobile station, a single precoding indicator which is representative of at least two sets of precoding coefficients,
   signaling from the mobile station the single selected precoding indicator to the base station, and wherein each set of the at least two sets of precoding coefficients applies for a different transmission mode from among a plurality of available different transmission modes.

2. The method of claim 1, wherein the different transmission modes includes at least one Single User-MIMO transmission mode, and one Multi User-MIMO transmission mode.

3. The method of claim 1, wherein the different transmission modes includes at least one MIMO transmission mode with a first transmission rank range, and one MIMO transmission mode with a second transmission rank range.

4. The method of claim 1, wherein the mobile station signals along with the single selected precoding indicator, a respective set of parameters for each transmission mode.

5. The method of claim 4, wherein each set of parameters includes for each respective transmission mode at least one of the following: the preferred rank of transmission, an achievable data rate, an estimate of an achievable data rate, additional information for at least one of the available transmission modes indicating a different set of precoding coefficients than signaled by the single selected precoding indicator.

6. The method of claim 1, further comprising the mobile station determining a set of recommended precoding coefficients for at least one of the available transmission modes to be signaled to the primary station by means of the single selected precoding indicator.

7. The method of claim 6, wherein the set of recommended precoding coefficients is selected out of a precoding codebook including a set of precoding matrices, and wherein the precoding indicator is a precoding matrix indicator representative of an index to an entry in the precoding codebook.

8. The method of claim 6, wherein the mobile station selects the set of recommended precoding coefficients, such that a joint rate is maximized, said joint rate being based on a weighted sum of the rates for rank 1 and the rank which gives the highest rate.

9. The method of claim 8, wherein the mobile station selects the set of recommended precoding coefficients corresponding to index i, and/or selects a rank from the set of possible ranks $r_k=\{r_{k,1}; \ldots ; r_{k,n}\}$ for at least one transmission mode, k, such that the rate:

$$R(i) = \sum_{k=1}^{m} \alpha_k R_{MIMOk}(i, r_k)$$

is maximized, where $0 \leq \alpha_k < 1$, R(i) is the joint data rate, and $R_{MIMOk}$ is the estimated data rate of the MIMO transmission mode k.

10. The method of claim 9, wherein $$\sum_{k=1}^{m} \alpha_k = 1.$$

11. The method of claim 8, wherein the joint rate is reported to the primary station.

12. The method of claim 9, wherein the mobile station reports to the primary station an estimated rate based on the product of the selected transmission rank and the data rate obtained for the set of recommended precoding coefficients with a predetermined rank.

13. The method of claim 12, wherein the predetermined rank is 1.

14. The method of claim 13, wherein the mobile station reports a joint rate which is determined from a combined weighted rate $$R_{av}=\delta r_{opt}R_{SU}(i_{opt},1)+\epsilon R_{SU}(i_{opt},r_{opt})$$

where $\delta$ and $\epsilon$ are weights, $r_{opt}$ is the optimal rank, $i_{opt}$ is the set of optimal precoding coefficients, and $R_{SU}(i,r)$ is the data rate for the transmission mode with rank r, and the set of precoding coefficients i.

15. The method of claim 11, wherein the rate reported to the base station is in the form of a plurality of rates.

16. The method of claim 15, wherein the plurality of rates each correspond to at least one of a plurality of transmission modes and/or a plurality of codewords.

17. A mobile station comprising:
means for communicating with at least one base station by means of MIMO transmissions,
means for selecting a single precoding indicator which is representative of at least two sets of precoding coefficients, and
means for signaling the single selected precoding indicator to the base station,
wherein each set of the at least two sets of precoding coefficients applies for a different transmission mode out of the plurality of available transmission modes.

18. A base station comprising:
means for communicating with at least one mobile station by means of multiple input / multiple output (MIMO) transmissions from the base station to the mobile station,
receiving means for receiving from the mobile station a single selected precoding indicator representative of at least two sets of recommended precoding coefficients,
control means for selecting a transmission mode out of a plurality of available different transmission modes, based at least in part on the received single selected precoding indicator,
wherein each set of the at least two sets of precoding coefficients applies for a different transmission mode out of the plurality of available transmission modes.

19. A method of operating a base station comprising:
communicating with at least one mobile station by means of multiple input/multiple output (MIMO) transmissions from the base station to the mobile station,
receiving from the mobile station a single selected precoding indicator representative of at least two sets of recommended precoding coefficients,
control means selecting a transmission mode out of a plurality of available different transmission modes, based at least in part on the received single selected precoding indicator,
wherein each set of the at least two sets of precoding coefficients applies for a different transmission mode out of the plurality of available transmission modes.

* * * * *